United States Patent [19]
Keeshin et al.

[11] 3,748,437
[45] July 24, 1973

[54] MOBILE FOOD CONCESSION CART

[75] Inventors: Ira A. Keeshin; Ronald J. Kruse, both of Cincinnati, Ohio

[73] Assignee: Federated Department Stores, Inc., Cincinnati, Ohio

[22] Filed: July 27, 1971

[21] Appl. No.: 166,387

[52] U.S. Cl. ............... 219/214, 4/187, 126/268, 219/283, 219/310, 219/479, 312/228, 312/236
[51] Int. Cl. .................. H05b 1/00, A47b 31/02
[58] Field of Search ............ 219/310, 312, 281–283, 219/306, 477–479, 214, 218; 126/268, 276; 312/228, 236, 140.2; 296/23, 24 A; 4/187 R

[56] References Cited
UNITED STATES PATENTS

| | | | |
|---|---|---|---|
| 1,929,063 | 10/1933 | Hampton | 312/228 X |
| 1,955,203 | 4/1934 | Salomon | 126/276 UX |
| 1,297,630 | 3/1919 | Zawisza | 312/236 X |
| 2,435,981 | 2/1948 | Rawson | 219/312 X |
| 2,900,045 | 8/1959 | Conklin et al. | 312/140.2 |
| 1,513,357 | 10/1924 | Webber | 126/268 |
| 1,727,395 | 9/1929 | Coffey | 126/268 |
| 2,594,938 | 4/1952 | Leavitt | 4/187 R |
| 381,621 | 4/1888 | Hall | 312/228 X |
| 1,840,033 | 1/1932 | Hampton | 312/228 X |
| 2,862,758 | 6/1954 | Robertson | 126/268 UX |

Primary Examiner—A. Bartis
Attorney—Truman A. Herron, Herbert C. Brinkman, Jr. et al.

[57] ABSTRACT

A mobile food cart for use in a portable food concession to function as a movable counter beside which a vendor may stand to sell food to customers. The cart is of the type which may be manually moved through doorways so that it may be used indoors and outdoors, and is provided with means to support and operate electrical food conditioning appliances to store and serve hot and cold food. A self-contained sink operates by gravity feed and includes a waste tank and a hot water reservoir having a thermostatically controlled immersion heater.

1 Claim, 3 Drawing Figures

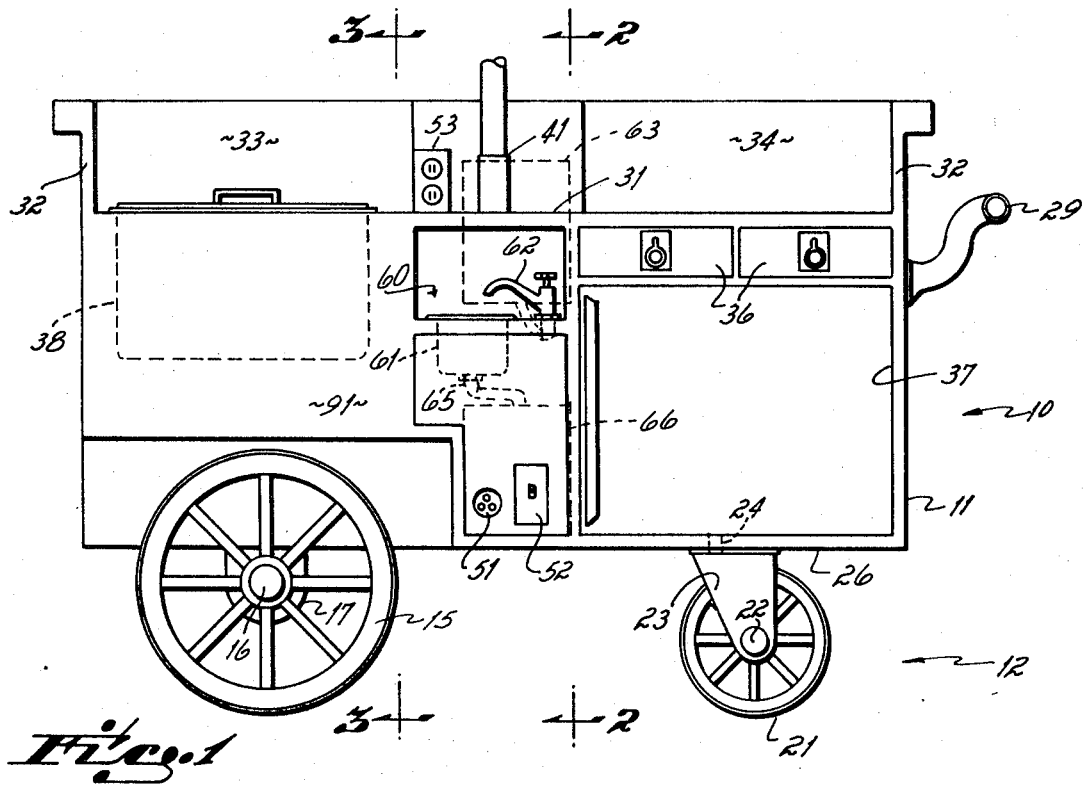
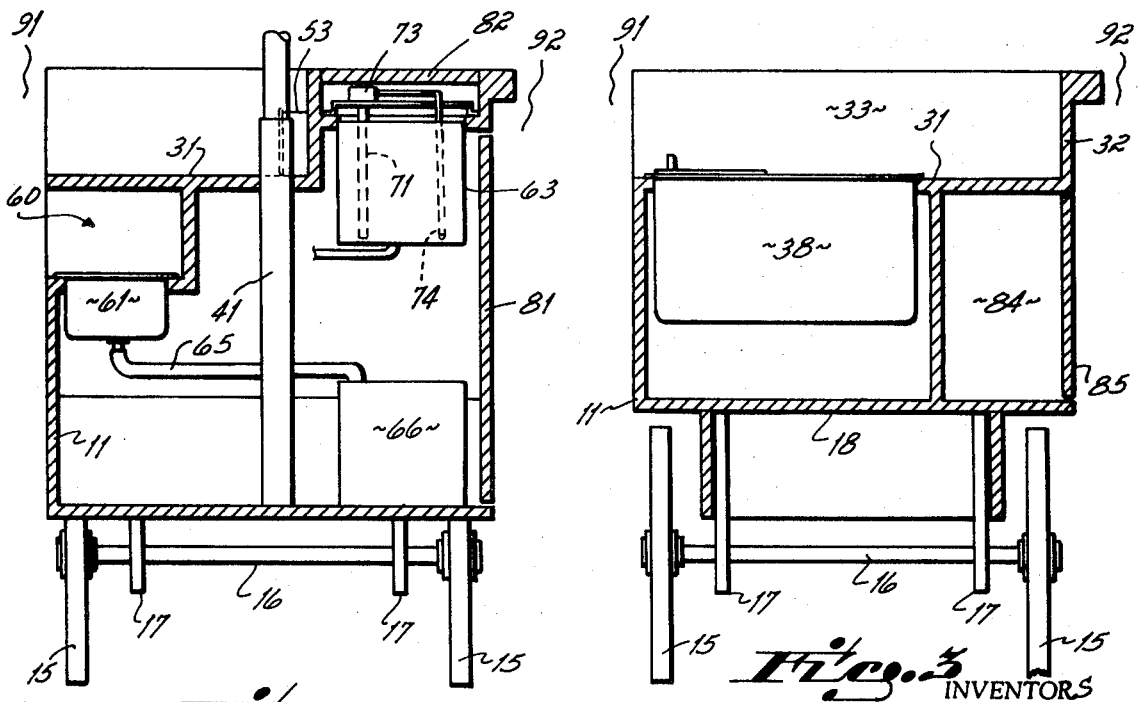

MOBILE FOOD CONCESSION CART

The present invention relates to mobile food or snack carts for use in the sale or service of hot and cold food items. More particularly, the present invention relates to manually movable indoor-outdoor type food carts which serve as portable service counters and, specifically, to self-contained and sanitary improvements therein.

At public events and gatherings of many types, food concessions are common, particularly, food concessions in which snack or light lunch food items are served to patrons or guests of the event or gathering. Typically, these food items would include hot sandwiches such as hot dogs or hamburgers, other freshly cooked items such as popcorn, or chilled or frozen items such as ice cream, beverages, and the like. The frequency of some events and the magnitude of the gatherings which they bring in many cases justifies the installation of permanent concession stands or snack counters which are equipped with appropriate appliances for preparing and preserving the food which is served. Other types of events may be large but infrequent in nature and, although justifying food service facilities for processing a large quantity of food, would not require nor justify permanently installed facilities, and, at such occurrences, large mobile vans or portable kitchens are commonly employed. Events of this type would be in the nature of carnivals, sports events, and the like. At both of the above classes of events, it is possible to provide relatively fully equipped kitchens and food processing facilities and to equip these facilities with running water and other sanitary features which are desirable in serving food to the public.

A third type of event at which it is desirable to provide customers with a food vending service or concession is one in which the magnitude or infrequency of the event does not justify permanently installed concession stands or snack bars, nor, due to the physical layout of the facility, is it possible to employ large mobile food service vans or to assemble a concession stand for the occasion. For example, at events such as the grand opening of a business establishment, or the special sale or promotion of department stores or other mercantile establishments, it is desirable to attract more than the usual number of patrons which normally gather at such places, and it is commonly desirable to provide snacks or light lunches for these customers. Usually, it is preferred that hot sandwiches, cold drinks, ice cream, snacks, and other light hot or cold food items be served. Due to the uncommon nature of the event, it is essential that the concession facility be temporary and portable in addition to having adequate means for serving the warm or cold food items. Usually, such events occur in confined quarters, as for example a store building or warehouse or meeting hall, and great disadvantage and inconvenience would be realized by employing facilities that would have to be completely reassembled and disassembled, and that could not be moved about or into and out of rooms through common doorways and passages.

Previous prior art solutions to the needs of such occasions have failed to provide adequate food service facilities with the convenience desired for such small scale events. Furthermore, due to the small scale nature of such events, the provision of such facilities with adequate sanitary means has been greatly lacking. One highly desirable provision in any food serving concession in which an attendant or vendor must necessarily handle the food which is to be served, is the provision for means by which the vending attendant can conveniently wash his hands frequently and clean his counter and utensils while he is working at the concession stand.

It is a principal objective of the present invention to provide a food service stand which fills the needs of such special events and also provides a practical and effective means of maintaining sanitary conditions.

It is a particular objective of the present invention to provide a portable concession for a food service facility which forms a self-contained food service counter and which can easily be moved about existing commercial facilities through their passageways and doors while fully assembled and which furthermore includes adequate sanitation means for a facility which serves food to the public, specifically, in the form of a self-contained sink and running water supply.

Accordingly, the present invention provides a mobile food cart which can serve as a counter beside which may stand the food vending attendant, and which cart is of the type which is no wider than commonly encountered doorframes and no longer than a convenient length which allows it to be moved through doorways and passageways of common commercial facilities. According to principles of the present invention, this cart is provided with food heating and cooling appliances sufficient to condition and store a certain minimum requirement of hot and cold food items and which is further provided with a self-contained running water sink by which the vending attendant can maintain the cart and his hands in a clean sanitary condition while serving food to the public from the cart.

The principal advantage of the present invention is that it provides a facility for the sanitary dispensing and selling of snack food items for a particular type of event for which sanitary food serving facilities have been previously unavailable by the devices of the prior art.

These and other objects and advantages of the present invention will be more readily apparent from the following detailed description of the drawings, illustrating one preferred form of the food service cart embodying principles of the present invention.

FIG. 1 is a side elevational view of the food cart embodying principles of the present invention, the view being taken from the vendor's side of the cart.

FIG. 2 is a cross sectional view along line 2—2 of FIG. 1 illustrating particularly the self-contained sink arrangement of the cart.

FIG. 3 is a cross sectional view along line 3—3 of FIG. 1 illustrating some of the storage and food handling appliance facilities of the cart of FIG. 1.

Referring to FIG. 1, a food cart 10 is illustrated according to principles of the present invention. A food cart 10 includes a body portion 11 which is portably mounted upon a wheel assembly 12 attached to the lower portion of the cart and which includes a pair of rear wheels 15 rotatably mounted upon a rear axle 16 which is secured through brackets 17 to the bottom rear portion 18 of the cart body 11. A single front wheel 21 is rotatably mounted about a front axle 22 carried by a bracket 23 which is pivotally mounted at a shaft 24 to the lower forward portion 26 of the cart body 11. The shaft 24 is mounted off the vertical center of the axle 22 so that the front wheel 21 can freely pivot about the shaft 24 in a caster like arrangement whereby the cart 10 can be manually steered by an attendant who pushes or pulls the cart by way of a handle 29. The wheels provide the easy movement of the cart in a longitudinal direction and the easy steering of the cart about obstacles in confined quarters.

The cart 10 is provided further with an upper counter surface 31 upon which a vendor may conveniently prepare any orders of food which he is selling. The upper horizontal surface 31 is surrounded by an upstanding wall portion 32 which surrounds the surface 31 on three sides thereof, but remains open on the fourth side, which is the side at which the vendor will stand when using the cart to permit his easy access to the surface 31.

The cart 10 is provided with supporting compartments which are adapted to receive various food service appliances such as hot dog cookers, bun warmers, popcorn poppers, cold drink dispensers, and the like. These compartments are illustrated as 33 and 34 in the drawings. The cart is also provided with additional storage compartments, such as drawers 36, and may be provided with appliances such as a refrigerator, which may be mounted in a lower compartment 37, for example, and an ice cube bin 38 which may be mounted as shown in the upper surface 31. All of the appliances which are provided with the cart 10 are readily accessible from the vendor's side of the cart.

The cart is further provided with an umbrella support assembly 41 which may receive and support an umbrella or canopy for covering the cart as a decorative item and for protection when the cart is used outdoors.

The cart 10 also includes means for connecting to an external electrical power supply such as the plug receptacle 51 which may be electrically connected in series through an on-off switch 52 to an outlet receptacle 53 which provides means for connecting the appliances to the electrical power source. The electrical circuitry may also be permanently wired to appliances which are built into the cart, such as a refrigerator.

The cart 10 is provided with a self-contained sink assembly 60, generally located so as to be readily accessible by a vendor at the vendor's side of the cart. The assembly includes a sink unit 61 to which water is supplied through a faucet 62, which connects to a water supply reservoir 63. The sink 61 is provided with a drain 65 which connects to a waste tank 66. The sink arrangement is best illustrated by reference to FIG. 2, which shows the reservoir 63 mounted above the sink 61 so that water will flow thereto under the influence of gravity. Similarly, the sink 61 is arranged above the waste tank 66 so that water will drain therefrom through the drain 65, also under the influence of gravity.

The water reservoir 63 is equipped to furnish hot water to the sink 61 by the provision of an immersion heater 71 having a heating element which is submerged in the reservoir 63. The heating element is electrically connected through the switch 62 to the power plug receptacle 51. The immersion heater 71 is thermostatically controlled by a thermostat unit 73 connected in series with the power leads to the heater 71 and controlled by a thermal sensor 74 which is immersed in the reservoir 63 to measure the temperature of the water contained therein. Preferably, the immersion heater 71 is the automatic shut-off type which will not draw any current when the reservoir 63 is empty. The cart 10 is provided with a removable panel 81 which permits access to the reservoir 63 and the waste tank 66 for inspection and removal thereof. Also, the cart 10 is provided with a removable cover 82 which permits exposure of the reservoir 63 for filling and inspection of the heater unit 71, and cleaning when necessary.

Referring to FIG. 3, the general arrangement of the food cart can be seen. The cart 10 is shown with its horizontal counter surface 31 having mounted therein the ice bin 38 and provided with the compartment 33 at which may be mounted a food service appliance such as a bun warmer or a hot dog or popcorn cooker, or soft drink dispenser, or the like. The cart is also provided with additional storage space 84 accessible through the access door 85.

The cart 10, as illustrated in FIG. 3, presents the vendor accessible side 91 at which all the appliances will be accessible, and the customer side 92 at which the customer is separated from the food preparation area 31 by the upstanding wall 32. Typically, the overall width of the cart should be less than that of a conventional door frame and is preferably somewhat less than 3 feet in width, preferably approximately 34 inches or less. The length of the cart is preferably approximately 6 feet so that the cart may be conveniently maneuvered through doorways and passageways of various commercial establishments for easy use.

As can be seen from the above description of the drawings, the preferred embodiment discussed and illustrated provides a portable, compact and self-contained food servicing unit which carries, stores and provides means for preparing and serving hot and cold food snacks while being readily maneuverable in small quarters and while further providing adequate sanitation facilities in the form of a completely self-contained sink and water supply unit. The unit is readily connectable to conventional AC power outlets which are most commonly available and thus operate conventional food conditioning appliances in a most efficient manner. Thus, the compactness and sanitary features which the present invention provides contribute a novel design for a food cart which fills a need heretofore not provided by the prior art.

What is claimed is:

1. A compact food cart for use as a mobile food concession from which hot and cold food items are sold, said cart being of the size and type which can be manually moved through common doorways and which can serve as a carrier and service counter for the food items to be sold, said cart comprising:

a body slightly less than three feet in width and having an upwardly facing horizontal counter surface;

two ends, a customer side and a vendor side;

vertical walls extending above said horizontal counter surface on said customer side and said two ends;

a steerable wheel assembly attached near the bottom of said cart body for supporting said body with said horizontal surface at approximate counter height, and said wheel assembly rendering said cart manually movable in a longitudinal direction;

means including said counter surface and said vertical walls for supporting and confining food conditioning appliances accessible from the vendor side of said cart;

means for supplying electrical energy to said food conditioning appliances to operate said appliances;

a sink disposed beneath said counter surface and having a faucet and a drain and arranged to be accessible from the vendor side of said cart;

a water reservoir having an outlet connected to said faucet, said reservoir being disposed behind said upstanding wall on the customer side and being elevated above said faucet so that water will flow into said sink from said reservoir when said faucet is open;

a waste tank having an inlet connected to said drain, said tank being positioned below said drain so that water will flow from said sink to said tank when said drain is open;

an immersion heater positioned in said reservoir and electrically connected to said electrical power supplying means; and a thermostat having a temperature sensing element positioned in said reservoir and a switch connected in series with said heater and said power supplying means and responsive to said sensing element for controlling the temperature of the water in said reservoir.

* * * * *